United States Patent
Wang et al.

(10) Patent No.: US 7,911,815 B2
(45) Date of Patent: Mar. 22, 2011

(54) PRIMARY-SIDE FEEDBACK CONTROL DEVICE AND RELATED METHOD FOR A POWER CONVERTER

(75) Inventors: Yen-Hui Wang, Hsinchu (TW); Chin-Yen Lin, Hsinchu County (TW); Chi-Hao Wu, Taipei (TW); Chia-Chieh Hung, Taoyuan County (TW)

(73) Assignee: Grenergy Opto, Inc., SBIP, Hsin-Chu (TW)

( * ) Notice: Subject to any disclaimer, the term of this patent is extended or adjusted under 35 U.S.C. 154(b) by 36 days.

(21) Appl. No.: 12/346,879

(22) Filed: Dec. 31, 2008

(65) Prior Publication Data

US 2010/0165666 A1 Jul. 1, 2010

(51) Int. Cl.
*H02M 3/335* (2006.01)
(52) U.S. Cl. .................... 363/21.12; 363/21.16
(58) Field of Classification Search ........ 363/21.08, 363/21.12, 21.16, 21.18, 95, 97
See application file for complete search history.

(56) References Cited

U.S. PATENT DOCUMENTS

| 6,091,614 | A | * | 7/2000 | Malenfant ............... 363/97 |
| 7,349,229 | B1 | * | 3/2008 | Yang ................. 363/21.16 |
| 7,679,936 | B2 | * | 3/2010 | Huynh et al. ............ 363/16 |
| 2009/0175057 | A1 | * | 7/2009 | Grande et al. ........ 363/21.15 |

* cited by examiner

*Primary Examiner* — Adolf Berhane
*Assistant Examiner* — Emily Pham
(74) *Attorney, Agent, or Firm* — Winston Hsu; Scott Margo

(57) ABSTRACT

A primary-side feedback control device for a power converter includes a control unit for generating a pulse signal according to a feedback signal for controlling on and off states of a switching transistor of the power converter, a comparator coupled to an auxiliary winding of a primary side of the power converter for generating at least one control signal according to a voltage on the auxiliary winding and a reference voltage, a sample-and-hold unit coupled to the auxiliary winding, the comparator, and the control unit for generating the feedback signal according to the voltage on the auxiliary winding and the at least one control signal, and a voltage generator coupled to the control unit, the comparator, and the sample-and-hold unit for generating the reference voltage according to the feedback signal.

34 Claims, 12 Drawing Sheets

PRIMARY-SIDE FEEDBACK CONTROL DEVICE AND RELATED METHOD FOR A POWER CONVERTER

BACKGROUND OF THE INVENTION

1. Field of the Invention

The present invention relates to a feedback control device and related method for a power converter, and more particularly, to a feedback control device and related method for generating a feedback signal according to a voltage on an auxiliary winding of the primary side of a power converter and generating a reference voltage according to the feedback signal.

2. Description of the Prior Art

A switching power supply (SPS) is used to convert AC power into DC regulated power for use by electronic equipment, and is widely used in a computer, an office automation system, industrial equipment and communications equipment. A power converter in a switching power supply can be of different types, e.g. a flyback converter, a forward converter, and a push-pull converter.

Please refer to FIG. 1, which is a schematic diagram of a power converter 10 according to the prior art. The power converter 10 is a flyback converter and comprises a transformer 100, a switch transistor 102, a pulse width modulation (PWM) control unit 104, an optocoupler 106, and a regulated and error amplifying circuitry 108 in which a shunt regulator diode TL431 is included. The transformer 100 comprises a primary winding $N_P$ and an auxiliary winding $N_A$ in the primary side and a secondary winding $N_S$ in the secondary side for transferring energy and isolating an output terminal and an input terminal of the power converter 10. The PWM control unit 104 generates a pulse signal to control on and off states of the switching transistor 102 so as to control the transformer 100 to transfer a regulated input voltage $V_{IN}$ to an output voltage $V_{OUT}$. When the switching transistor 102 is turned on, energy is stored in the primary winding $N_P$ of the transformer 100; and when the switching transistor 102 is turned off, the energy stored in the primary winding $N_P$ is delivered to the secondary winding $N_S$ and therefore the output voltage $V_{OUT}$ is generated. Note that when a current flows through the secondary winding $N_S$, variance of the output voltage $V_{OUT}$ is sensed through the auxiliary winding $N_A$.

In order to make the output voltage $V_{OUT}$ stable, a secondary-side feedback control scheme used in the power converter 10 is to amplify error of the output voltage $V_{OUT}$ through the shunt regulator diode TL431 to generate a feedback signal and transfer the feedback signal to the PWM control unit 104 through the optocoupler 106 for performing feedback control. When the output voltage $V_{OUT}$ varies, the PWM control unit 104 adjusts duty cycle of the pulse signal according to the feedback signal to control the switching transistor 102, for regulating the energy delivered to the load of the secondary side of the power converter 10. However, the optocoupler 106 and the shunt regulator diode TL431 are expensive components and occupy a large space in the power converter 10, such that product cost of the power converter 10 cannot be reduced.

Please refer to FIG. 2, which is a schematic diagram of a power converter 20 using primary-side feedback control according to the prior art. The power converter 20 is also a flyback converter and comprises a transformer 200, a switch transistor 202, a PWM control unit 204 and other necessary passive components not described here. Different from the power converter 10, the power converter 20 generates a feedback signal according to a voltage on an auxiliary winding $N_A$ instead of using an optocoupler and a shunt regulator diode TL431. When current flows through the secondary winding $N_S$ of the power converter 20, variance of the output voltage $V_{OUT}$ is sensed through the auxiliary winding $N_A$. The voltage on the auxiliary winding $N_A$ is used as a feedback signal sent to the PWM control unit 204. The PWM control unit 204 adjusts duty cycle of a pulse signal according to the feedback signal to control the switching transistor 202 for regulating energy delivered to a load in the secondary side. Note that the power converter 200 is implemented with many more components than shown in FIG. 2. Even if product cost of the power converter 20 is much less than the power converter 10, it still has a lot of room for improvement.

In order to improve the above drawbacks, Applicant of the present invention has disclosed a power converter with a primary-side feedback control device, as shown in FIG. 3. FIG. 3 is a schematic diagram of a power converter 30 according to the prior art. Feedback control operation of the power converter 30 is similar to that of the power converter 20 except for inclusion of a feedback control device 308. The feedback control device 308 comprises a control unit 310, a comparator 312 and a sample-and-hold unit 314. The comparator 312 is coupled to an auxiliary winding $N_A$ of the power converter 30 and is utilized for comparing the voltage on the auxiliary winding $N_A$ with a predefined reference voltage $V_{REF}$ for generating control signals for controlling the sample-and-hold unit 314. The sample-and-hold unit 314 is controlled by the control signals to output a feedback signal to the control unit 310. The control unit 310 generates a pulse signal $V_{PWM}$ according to the feedback signal to control on and off states of a switching transistor 306, so the energy is transferred from the primary side to the secondary side.

Note that, when the power converter 30 is turned on at the beginning, LC (inductance-capacitance) ringing occurs on the voltage on the auxiliary winding $N_A$. In this situation, if the predefined reference voltage $V_{REF}$ is non-adjustable and lower than a voltage of the feedback signal, the voltage of the feedback signal may be decreased continuously such that a voltage of the pulse signal $V_{PWM}$ is not large enough to drive the switching transistor 306.

From the above, using the optocoupler and the shunt regulator diode TL431 is an expensive solution for feedback control and the production cost is not reduced. On the other hand, although the primary-feedback control device the Applicant has disclosed has a reduced cost, it cannot prevent influence of LC ringing when the power converter is just turned on, which ultimately results in failure to control the switching transistor.

SUMMARY OF THE INVENTION

It is therefore a primary objective of the claimed invention to provide a primary-side feedback control device for a power converter and related power converter and method.

The present invention discloses a primary-side feedback control device for a power converter. The primary-side feedback control device comprises a control unit, a comparator, a sample-and-hold unit and a voltage generator. The control unit is utilized for generating a pulse signal according to a feedback signal for controlling on and off states of a switching transistor of the power converter. The comparator is coupled to an auxiliary winding of a primary side of the power converter, and is utilized for generating at least one control signal according to a voltage on the auxiliary winding and a reference voltage. The sample-and-hold unit is coupled to the auxiliary winding, the comparator and the control unit, and is utilized for generating the feedback signal according to the voltage on the auxiliary winding and the at least one control signal. The voltage generator is coupled to the control unit, the comparator and the sample-and-hold unit, and is utilized for generating the reference voltage according to the feedback signal.

The present invention further discloses a power converter of primary-side feedback control. The power converter comprises an input terminal for receiving an input voltage, an output terminal for outputting an output voltage, a transformer comprising a primary winding coupled to the input terminal, an auxiliary winding coupled to the primary winding and a secondary winding coupled to the output terminal for transferring the input voltage to the output voltage, a switching transistor coupled to the primary winding for controlling the transformer to store and transfer energy according to a pulse signal, and a feedback control device coupled to the switching transistor. The feedback control device comprises a control unit, a comparator, a sample-and-hold unit and a voltage generator. The control unit is utilized for generating a pulse signal according to a feedback signal for controlling on and off states of a switching transistor. The comparator is coupled to an auxiliary winding and is utilized for generating at least one control signal according to a voltage on the auxiliary winding and a reference voltage. The sample-and-hold unit is coupled to the auxiliary winding, the comparator and the control unit, and is utilized for generating the feedback signal according to the voltage on the auxiliary winding and the at least one control signal. The voltage generator is coupled to the control unit, the comparator and the sample-and-hold unit, and is utilized for generating the reference voltage according to the feedback signal.

The present invention further discloses a feedback control method for a power converter. The feedback control method comprises generating a first voltage according to a voltage on a primary-side auxiliary winding of the power converter, comparing the voltage on the auxiliary winding with a reference voltage for generating a comparison result, generating at least one control signal according to the comparison result, generating a feedback signal according to the first voltage and the at least one control signal, for controlling on and off states of a switching transistor of the power converter, and generating the reference voltage according to the feedback signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
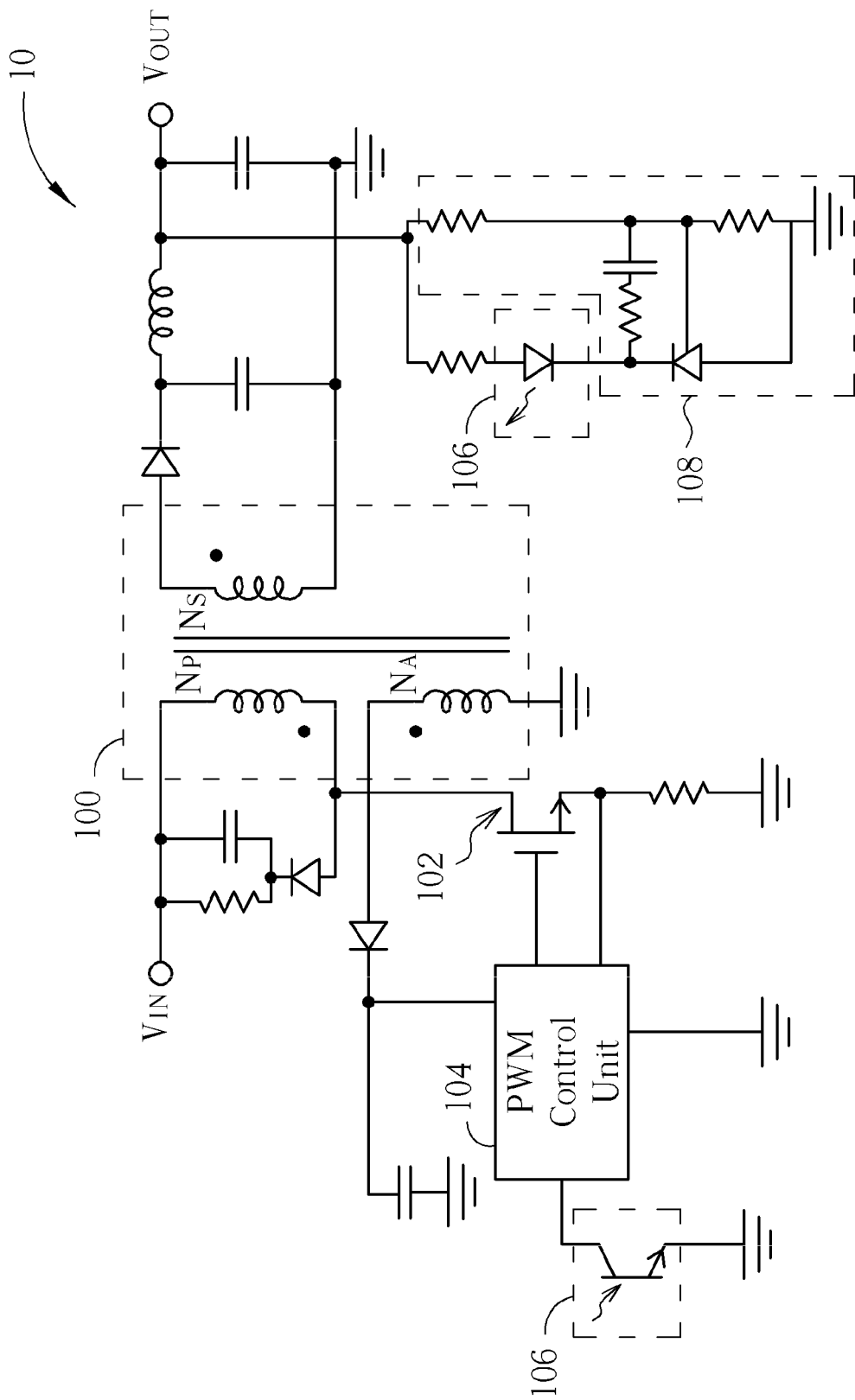
FIG. 1 to FIG. 3 are schematic diagrams of power converters according to the prior art.
Figure 2:
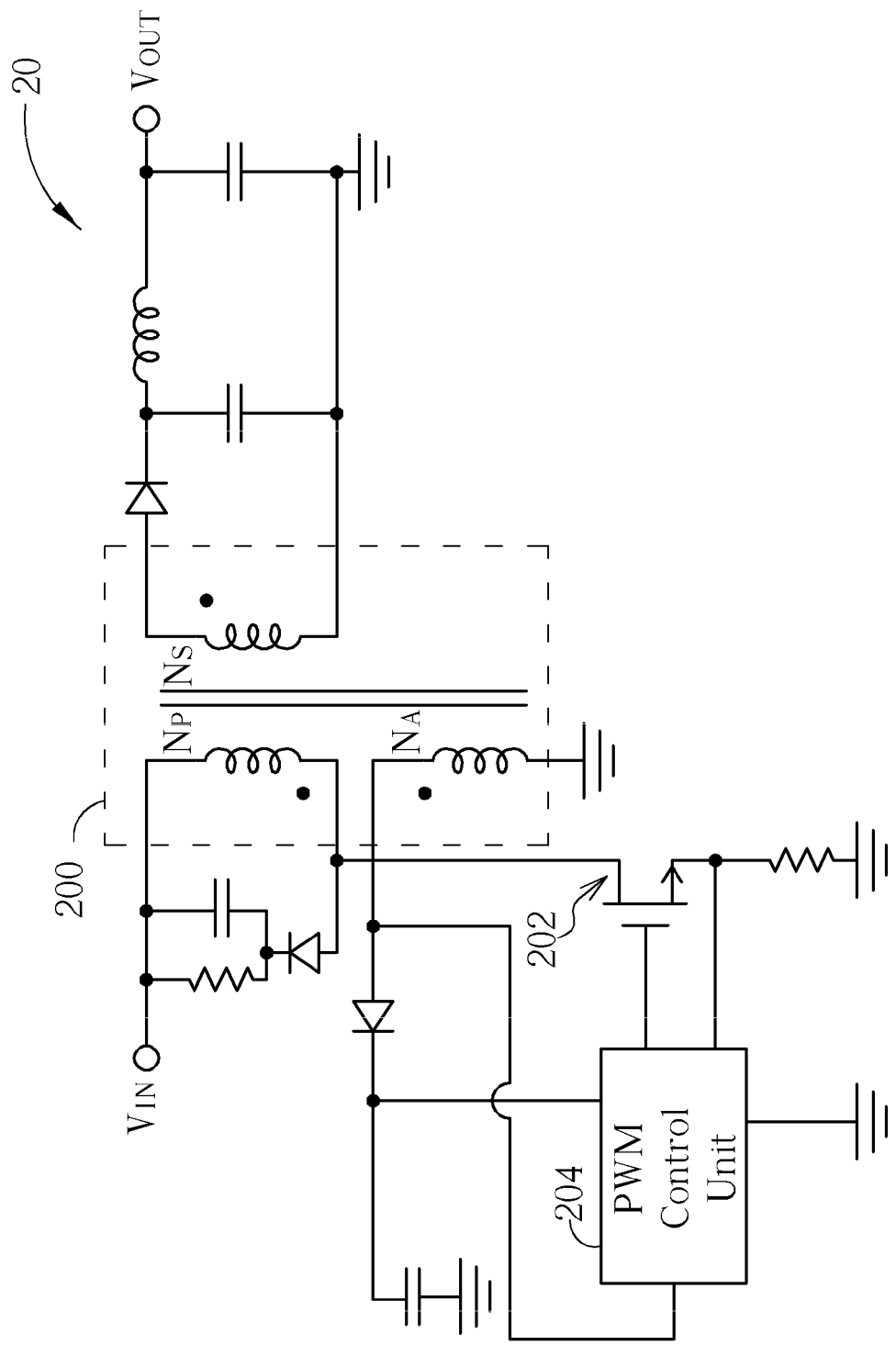
Figure 3:
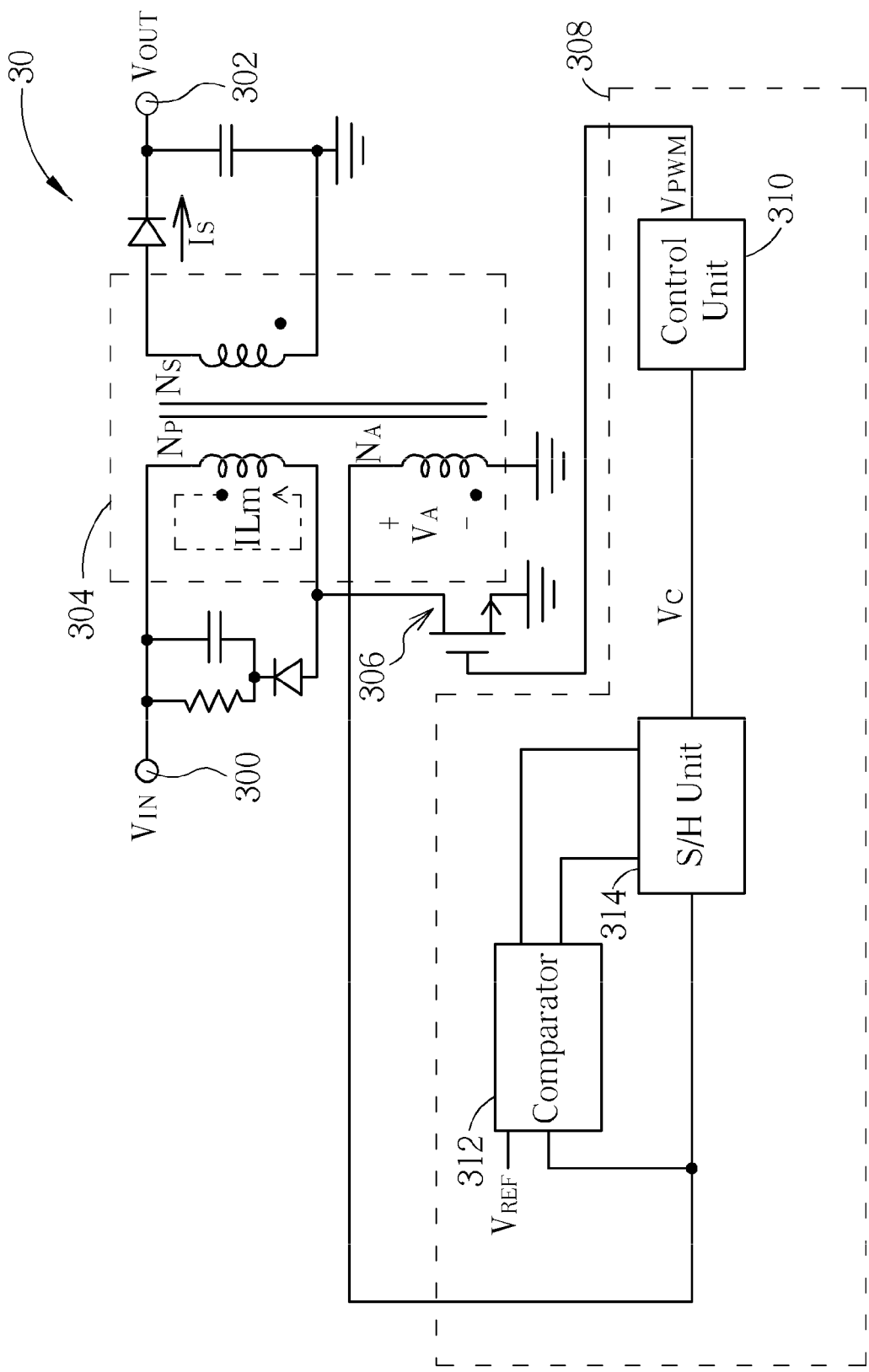

The present invention aims to provide a power converter with primary-side feedback control having lower production cost. Please refer to FIG. 4, which is a schematic diagram of a power converter 40 according to an embodiment of the present invention. The power converter 40 performs primary-side feedback control and comprises an input terminal 400, an output terminal 402, a transformer 404, a switching transistor 406 and a feedback control device 408. The power converter 40 receives an input voltage $V_{IN}$ via the input terminal 400 and outputs an output voltage $V_{OUT}$ via the output terminal 402. The transformer 404 comprises a primary winding $N_P$ coupled to the input terminal 400, an auxiliary winding $N_A$ coupled to the primary winding $N_P$ and a secondary winding $N_S$ coupled to the output terminal 402. The transformer 404 is utilized for transferring energy of the input voltage $V_{IN}$ from the primary winding $N_P$ to the secondary winding $N_S$ for generating the output voltage $V_{OUT}$.

The switching transistor 406 is coupled to the primary winding $N_P$ and is utilized for controlling energy storage and transfer of the transformer 404 according to a pulse signal $V_{PWM}$. Utilization of on and off states of the switching transistor 406 to control the transformer 404 is described previously and is not repeated. The feedback control device 408 is coupled to the switching transistor 406 and comprises a voltage dividing unit 410, a voltage follower 412, a comparator 414, a sample-and-hold (S/H) unit 416, an error amplifier 418, a control unit 420 and a voltage generator 422. The feedback control device 408 is utilized for generating a feedback signal and generating the pulse signal $V_{PWM}$ according to the feedback signal for controlling on and off states of the switching transistor 406 according to the pulse signal $V_{PWM}$.

The feedback control device 408 is described in detail as follows. The voltage dividing unit 410 is utilized for dividing a voltage $V_A$ on the auxiliary winding $N_A$ because the voltage $V_A$ on the auxiliary winding $N_A$ has a higher voltage. When the voltage $V_A$ on the auxiliary winding $N_A$ varies, a divided voltage $V_F$ outputted from the voltage dividing unit 410 varies correspondingly. The voltage follower 412 is coupled to the voltage dividing unit 410 and is utilized for outputting a voltage $V_a$ following the divided voltage $V_F$ to the S/H unit 416. In other words, variance of the voltage $V_a$ follows variance of the voltage $V_A$ on the auxiliary winding $N_A$.

The comparator 414 is coupled to the voltage dividing unit 410 and is utilized for comparing the divided voltage $V_F$ with a reference voltage $V_{REF}$ for generating a comparison result and outputting a first control signal G1 and a second control signal G2 according to the comparison result. The S/H unit 416 is coupled to the voltage follower 412, the comparator 414, the error amplifier 418 and the voltage generator 422, and is utilized for generating the feedback signal according to the voltage $V_a$, the first control signal G1 and the second control signal G2. Please note that the S/H unit 416 also feeds the feedback signal back to the voltage generator 422. The error amplifier 418 is coupled to the S/H unit 416 and the control unit 420, and is utilized for amplifying an error of the feedback signal for output to the control unit 420. The control unit 420 is coupled to the error amplifier 418 and the switching transistor 406, and is utilized for generating the pulse signal $V_{PWM}$ according to the signal outputted from the error amplifier 418, for controlling on and off states of the switching transistor 406. The voltage generator 422 is coupled to the control unit 420, the comparator 412 and the S/H unit 416, and is utilized for generating the reference voltage $V_{REF}$ according to the feedback signal.

Note that the reference voltage $V_{REF}$ is adjustable. Therefore, when LC ringing occurs in the voltage $V_A$ on the auxiliary winding $N_A$ when the power converter 40 is just turned on at the beginning, the adjustable reference voltage $V_{REF}$ prevents a voltage of the feedback signal, denoted as $V_c$, from being decreased continuously when the reference voltage $V_{REF}$ is lower than the voltage $V_c$. According to the embodiment of the present invention, the reference voltage $V_{REF}$ is a constant or a variable times the voltage $V_c$, denoted as $\alpha V_c$, wherein $\alpha$ is a constant or a variable. The adjustable reference voltage $V_{REF}$ is introduced in detail later.

The feedback control device 408 is described as follows. When the voltage $V_A$ on the auxiliary winding $N_A$ comes to a specific voltage, the divided voltage $V_F$ comes to the reference voltage $V_{REF}$. At the same time, the voltage follower 412 outputs the voltage $V_a$ following the divided voltage $V_F$ to the S/H unit 416, and the comparator 414 outputs the first control signal G1 and the second control signal G2 to the S/H unit 416. The S/H unit 416 samples the voltage $V_a$ according to the first control signal G1 and the second control signal G2, for generating the feedback signal. In other words, the feedback signal is generated according to the voltage $V_A$ on the auxiliary winding $N_A$. At the same time, the S/H unit 416 feeds the feedback signal back to the voltage generator 422. The voltage generator 422 then generates the reference voltage $V_{REF}$ as $\alpha V_c$. In other words, the reference voltage $V_{REF}$ is adjusted according to the voltage of the feedback signal. Next, the error amplifier 418 amplifies the error of the feedback signal, and the control unit 420 generates the pulse signal $V_{PWM}$ for controlling on and off states of the switching transistor 406.

Figure 4:
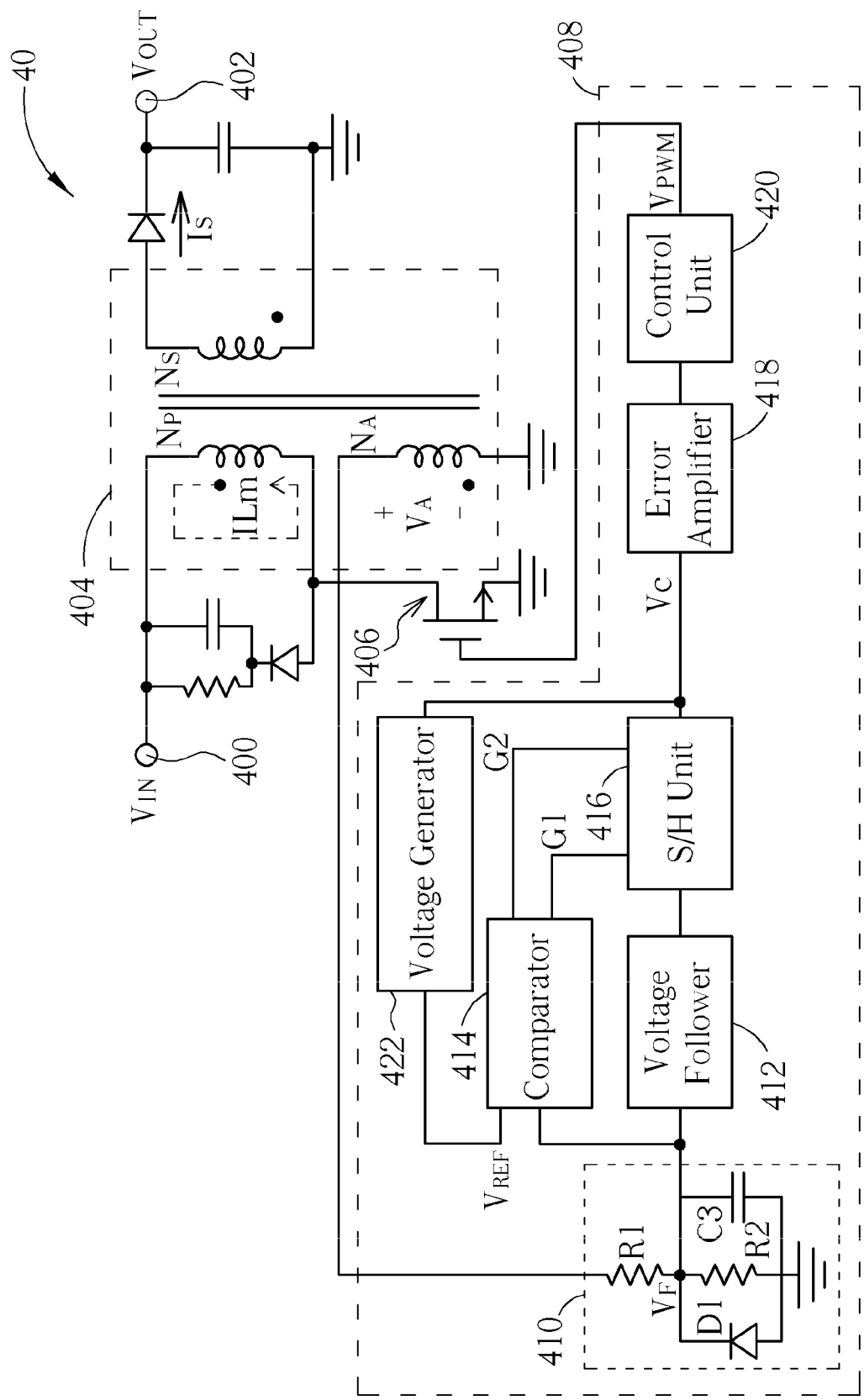
FIG. 4 to FIG. 8 are schematic diagrams of power converters according to an embodiment of the present invention.

As shown in FIG. 4, the voltage dividing unit 410 comprises resistors R1 and R2, a diode D1 and a capacitor C3. The resistors R1 and R2 are used to divide the voltage $V_A$ on the auxiliary winding $N_A$ to generate the divided voltage $V_F$. The resistor R1 has one terminal coupled to the auxiliary winding $N_A$ and another terminal coupled to the voltage follower 412 and the comparator 414. The resistor R2 has one terminal coupled to the resistor R1, the voltage follower 412 and the comparator 414 and another terminal coupled to a ground terminal. The diode D1 and the capacitor C3 are used for stability. Cathode of the diode D1 is coupled to the resistors R1, R2, the voltage follower 412 and the comparator 414; anode of the diode D1 is coupled to the ground terminal. The capacitor C3 has one terminal coupled to the resistors R1, R2, the voltage follower 412 and the comparator 414 and another terminal coupled to the ground terminal. Note that the voltage dividing unit 410 in FIG. 4 is one of embodiments of the present invention, and the voltage dividing unit 410 can also be implemented by other circuitry.

Figure 5:
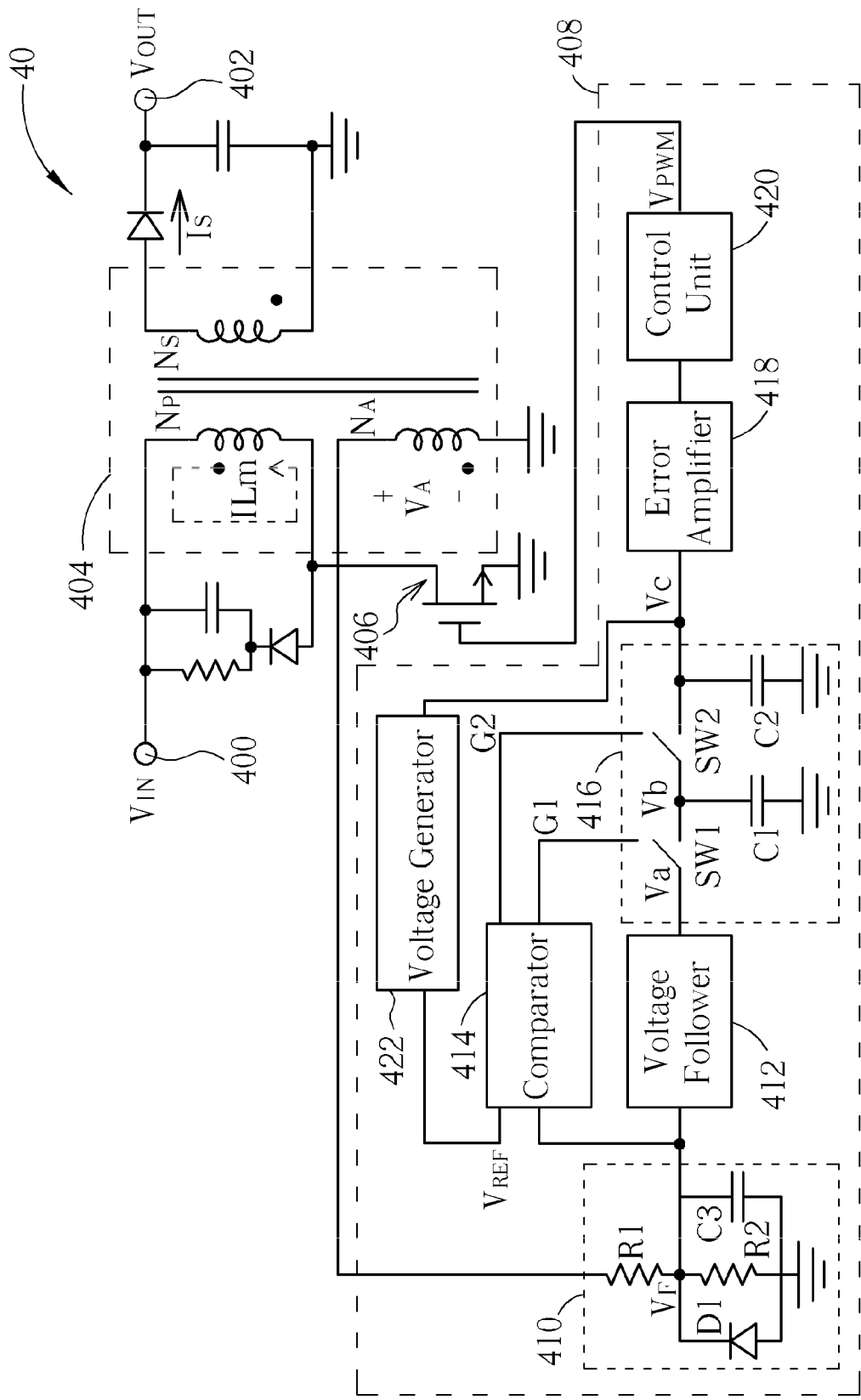

The S/H unit 416 is described in detail as follows. The S/H unit 416 comprises at least one switch and one capacitor. Please refer to FIG. 5, which is also a schematic diagram of the power converter 40. In FIG. 5, the S/H unit 416 further comprises switches SW1 and SW2 and capacitors C1 and C2. The switch SW1 is coupled to the voltage follower 412 and the comparator 414. The switch SW2 is coupled to the comparator 414, the switch SW1 and the error amplifier 418. The capacitor C1 has one terminal coupled to the switches SW1 and SW2 and another terminal coupled to the ground terminal. The capacitor C2 has one terminal coupled to the switch SW2 and the error amplifier 418 and another terminal coupled to the ground terminal. When a current flows through the secondary winding $N_S$, the variance of the output voltage $V_{OUT}$ is sensed through the auxiliary winding $N_A$. The voltage dividing unit 410 divides the voltage $V_A$ on the auxiliary winding $N_A$ to generate the divided voltage $V_F$. The voltage follower 412 outputs the voltage $V_a$ which follows the divided voltage $V_F$ to the S/H unit 416.

At the same time, when the comparison result generated by the comparator 414 indicates that the divided voltage $V_F$ is higher than the reference voltage $V_{REF}$, the comparator 414 outputs the first control signal G1 to turn on the first switch SW1 and outputs the second control signal G2 to turn off the second switch SW2, so that the voltage $V_a$ is stored on the capacitor C1, denoted as a voltage $V_b$. When the comparison result indicates that the divided voltage $V_F$ is lower than or equal to the reference voltage $V_{REF}$, the comparator 414 outputs the first control signal G1 to turn off the first switch SW1 and outputs the second control signal G2 to turn on the second switch SW2, so that the voltage $V_b$ on the capacitor C1 is transferred to the capacitor C2, which generates the feedback signal. In other words, when the first switch SW1 is turned on and the second switch SW2 is turned off, the voltage $V_b$ on the capacitor C1 is continuously tracking the divided voltage $V_F$; and, when the first switch SW1 is turned off and the second switch SW2 is turned on, the voltage $V_b$ on the capacitor C1 is held at a knee point of the divided voltage $V_F$ and therefore the voltage $V_c$ on the capacitor C2 is equal to the knee point voltage. The S/H unit 416 outputs the voltage $V_c$ so that the control unit 420 generates the pulse signal $V_{PWM}$ according to the feedback signal.

Note that, the feedback control device 408 shown in FIG. 4 and FIG. 5 is one embodiment of the present invention, and those skilled in the art can make alterations and modifications accordingly. For example, the voltage dividing unit 410 can be implemented by different circuitry. Besides, the comparator 414 can output only one control signal to the S/H unit 416, and the S/H unit 416 may generate required control signals, e.g. using an inverter to generate another control signal. In addition, switches and capacitors in the S/H unit 416 can be arranged differently for performing the sample-and-hold function. Any other device for generating a feedback signal by an S/H circuit should be included in embodiments of the present invention.

Figure 6:
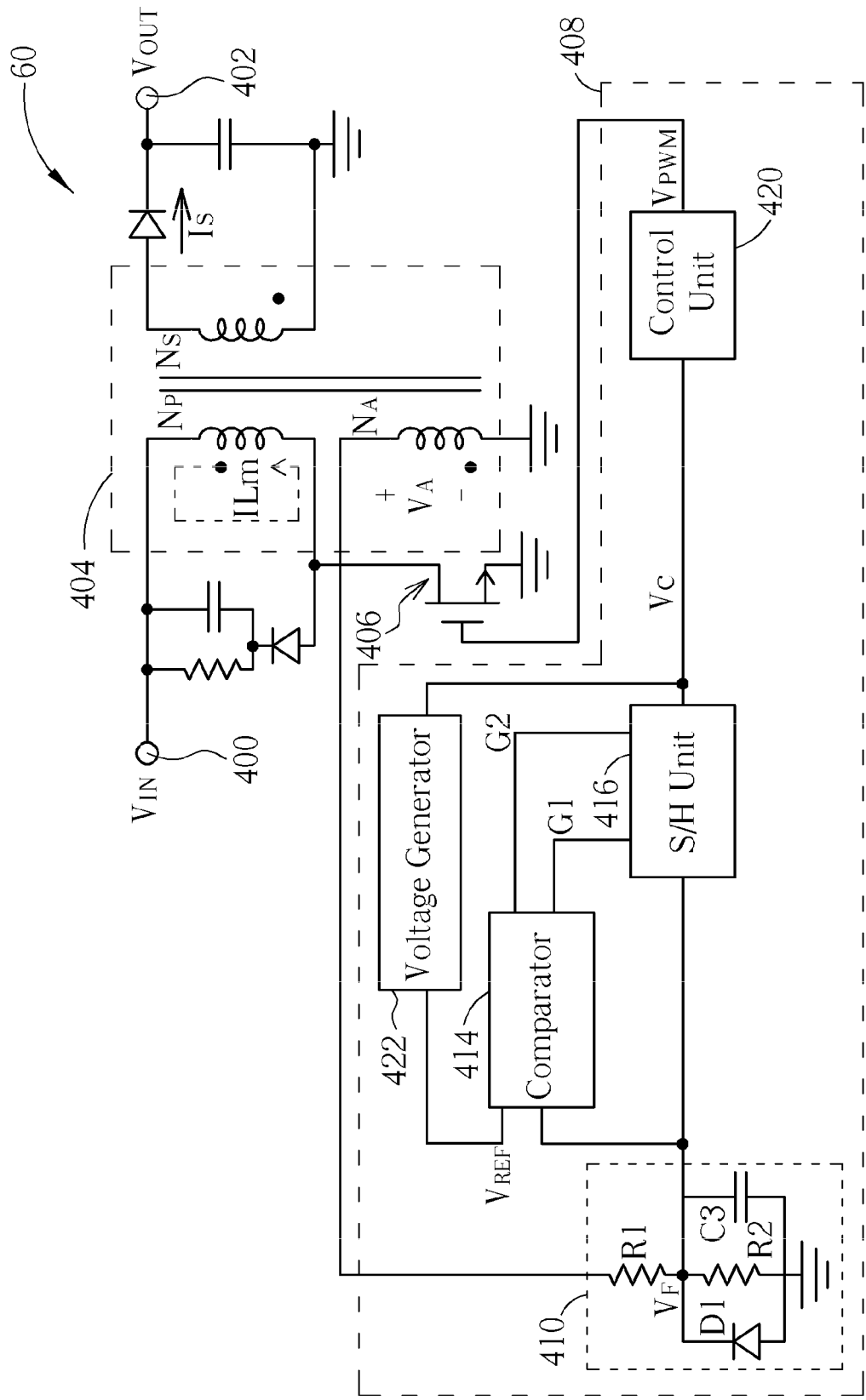
Figure 7:
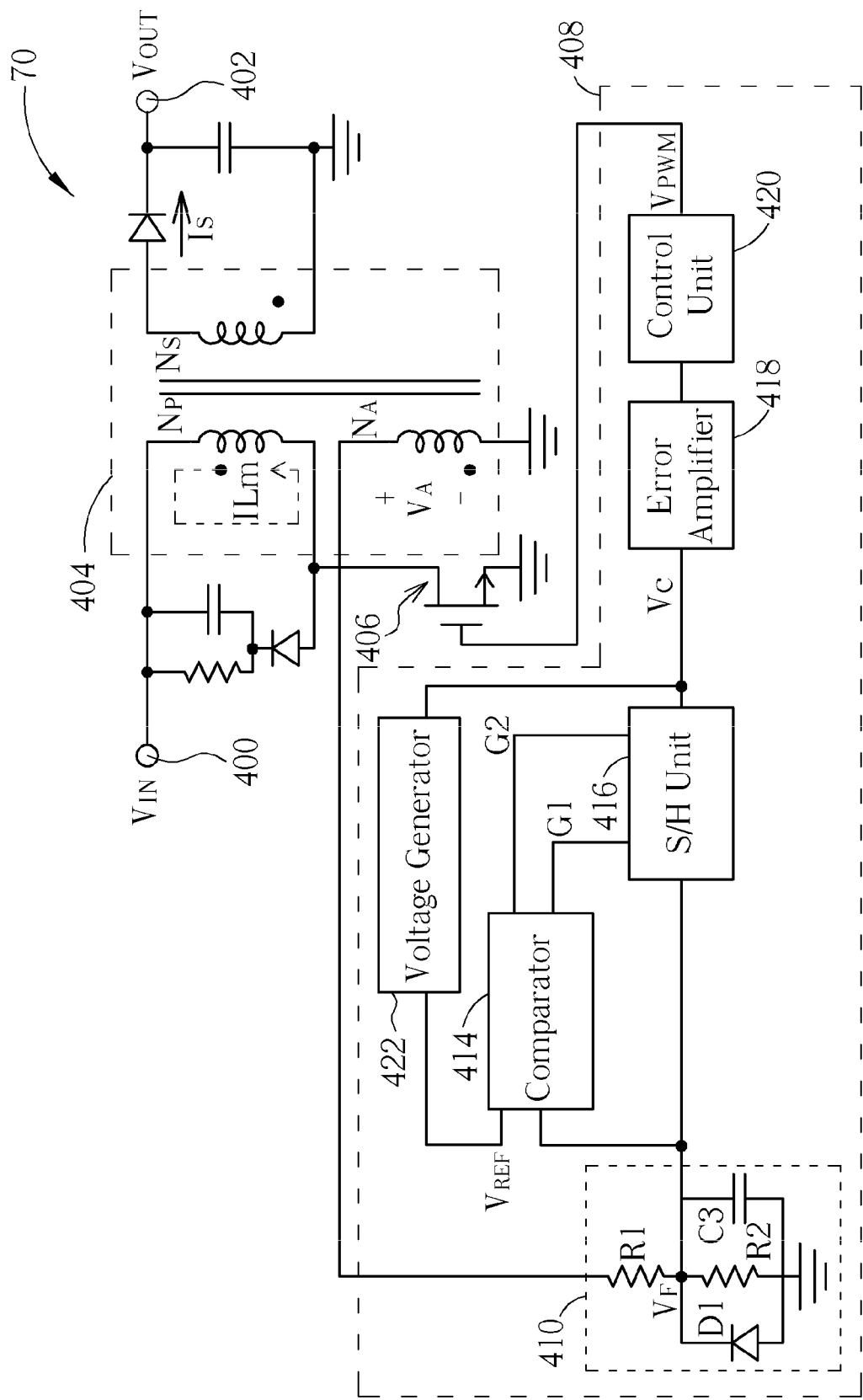
Figure 8:
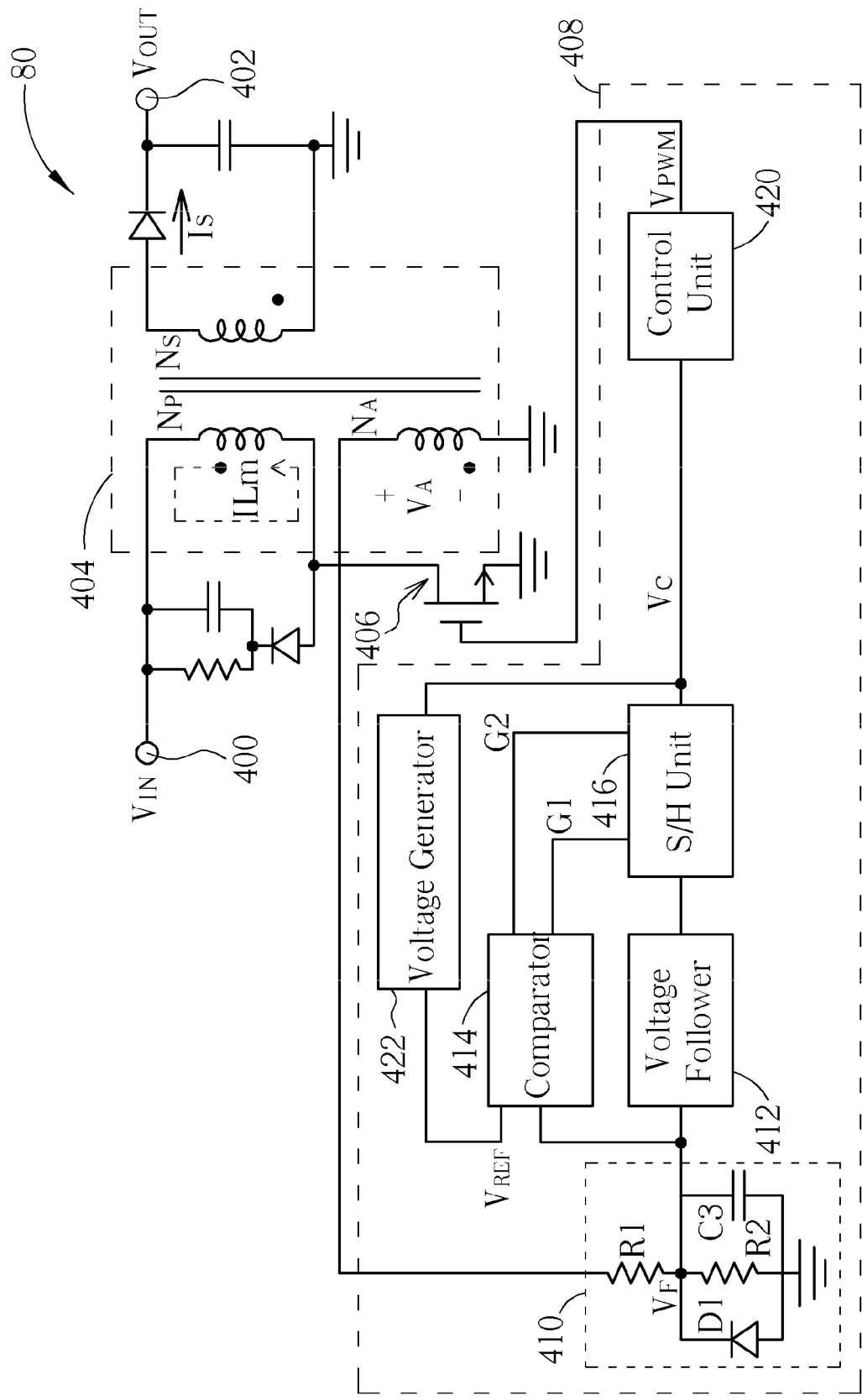

Furthermore, the voltage follower 412 and the error amplifier 418 are used or ignored depending on requirements. Please refer to FIG. 6 to FIG. 7, which are schematic diagrams of power converters 60, 70 and 80 according to embodiments of the present invention. The power converters 60, 70 and 80 are similar to the power converter 40, differing in that the power converter 60 does not include the voltage follower 412 and the error amplifier 418; the power converter 70 does not include the voltage follower 412; and the power converter 80 does not include the error amplifier 418. Operations of the power converters 60, 70 and 80 are similar to the power converter 40, and are not repeated again.

Figure 9:
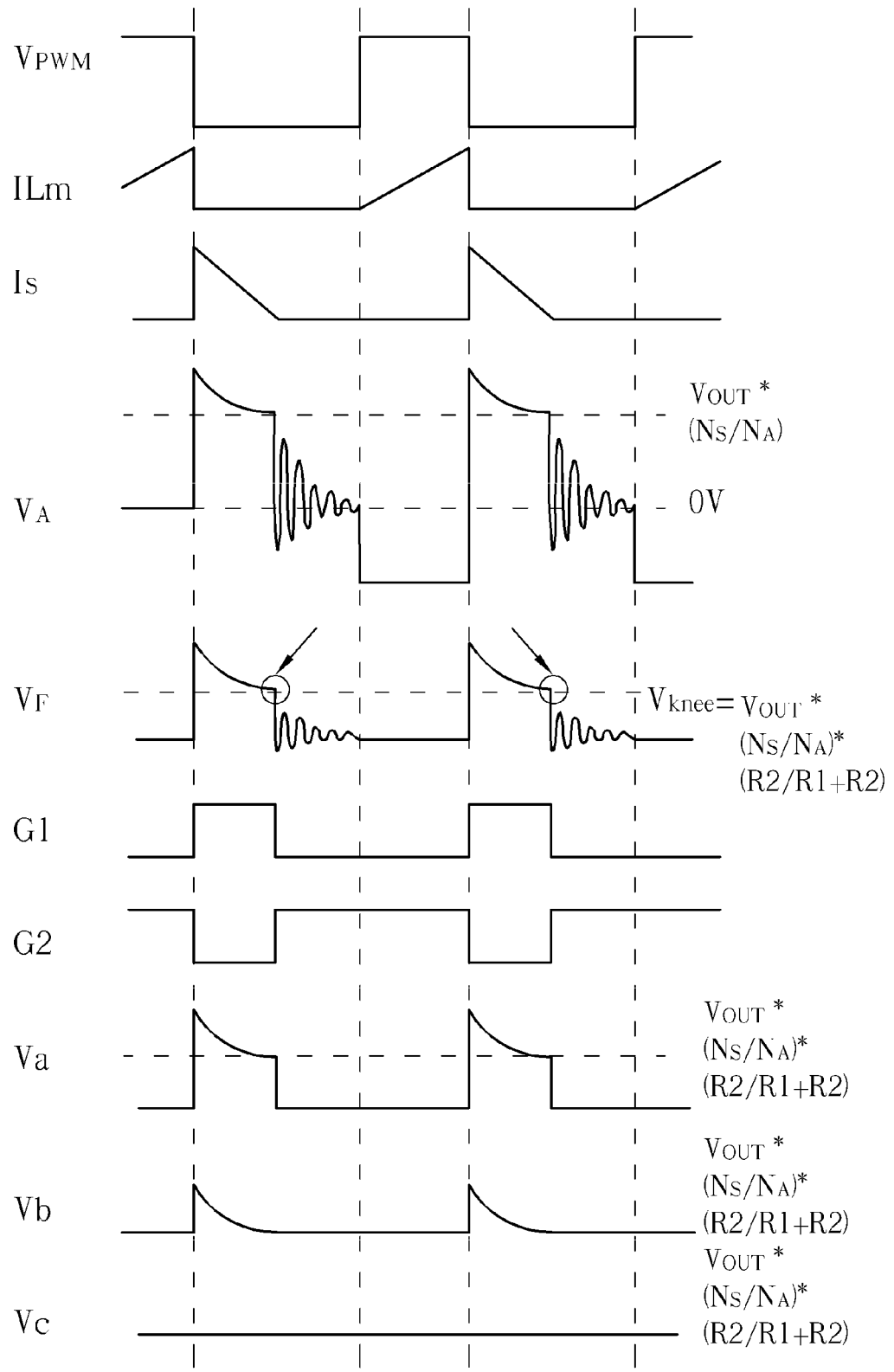
FIG. 9 is a voltage waveform diagram of signals in the power converter in FIG. 5.

Please refer to FIG. 9, which illustrates a voltage waveform diagram of signals in the power converter 40 in FIG. 5, including the pulse signal $V_{PWM}$, a current ILm flowing through the primary winding $N_P$, a current Is flowing through the secondary winding $N_S$, the voltage $V_A$ on the auxiliary winding $N_A$, the divided voltage $V_F$, the first control signal G1, the second control signal G2, the voltage $V_a$ outputted from the voltage follower 412, the voltage $V_b$ on the capacitor C1, and the voltage $V_c$ on the capacitor C2 (which is also the voltage of the feedback signal). As shown in FIG. 9, a knee point of the voltage $V_A$ on the auxiliary winding $N_A$ is $V_{OUT} \times (N_S/N_A)$; a knee point of the divided voltage $V_F$ is $V_{OUT} \times (N_S/N_A) \times R2/(R1+R2)$. The voltage $V_b$ on the capacitor C1 follows the divided voltage $V_F$; and the voltage $V_c$ on the capacitor C2 is equal to the knee point of the divided voltage $V_F$.

As mentioned previously, the reference voltage $V_{REF}$ is equal to $\alpha V_c$ and $\alpha$ is a constant or a variable. When the power converter 40 is in an abnormal operating state, or is just turned on, the reference voltage $V_{REF}$ with a variable $\alpha$ prevents the voltage $V_c$ from being deadlocked by LC ringing. Under a light load, when the power converter 40 enters a protection mode, the switching transistor 406 is turned off, the voltage $V_c$ is decreased and the output voltage $V_{OUT}$ is decreased slowly. When the power converter 40 is released from the protection mode and restarts, the output voltage $V_{OUT}$ approximates a normal voltage because the output voltage $V_{OUT}$ is decreased slowly in the previous protection mode. However, the voltage $V_c$ is increased from a low voltage approximating zero voltage. In this situation, α is set to a value greater than 1 such that the reference voltage $V_{REF}$ is higher than the voltage $V_c$, that is, $\alpha V_c > V_c$, during each cycle. Therefore, the voltage $V_c$ is increased and is not deadlocked at zero voltage.

Figure 10:
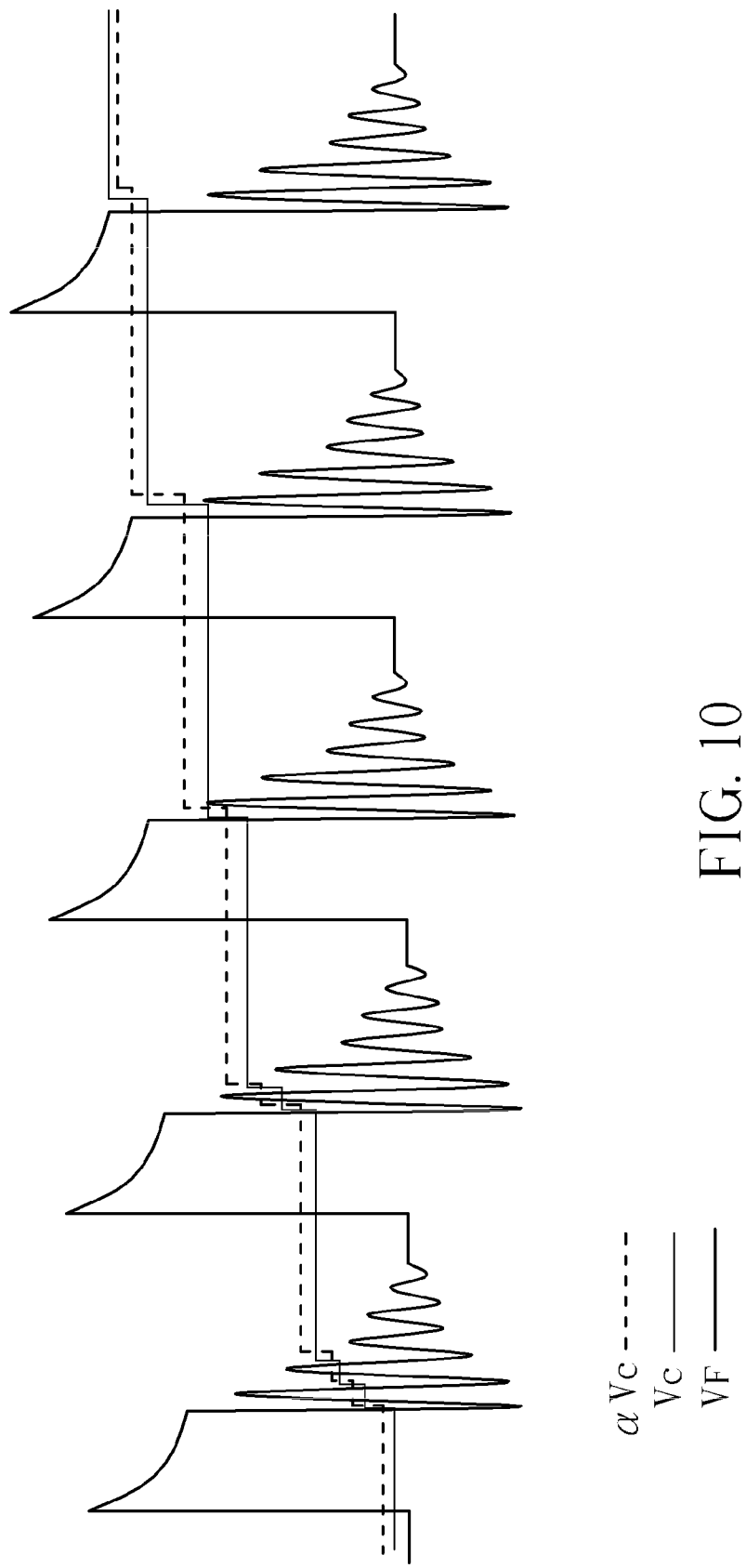
FIG. 10 and FIG. 11 are voltage waveform diagrams of the divided voltage, the reference voltage and the voltage of the feedback signal shown in FIG. 5.

Please refer to FIG. 10, which illustrates a voltage waveform diagram of the divided voltage $V_F$, the voltage $V_c$ and the reference voltage $V_{REF}$ with a variable α when the power converter 40 is in an abnormal operating state. The variable α is adjusted according to a comparison of the voltage $V_c$ and the knee point of the divided voltage $V_F$, denoted as $V_{knee}$. When the voltage $V_c$ is lower than the voltage $V_{knee}$ or when the divided voltage $V_F$ is unstable, as in FIG. 10, α is set to a value greater than 1, such that the voltage $V_c$ approximates the voltage $V_{knee}$ quickly and is not deadlocked at zero voltage. When the voltage $V_c$ is higher than or equal to the voltage $V_{knee}$, the present invention sets α less than or equal to 1, such that the voltage $V_c$ also approximates the voltage $V_{knee}$.

Figure 11:
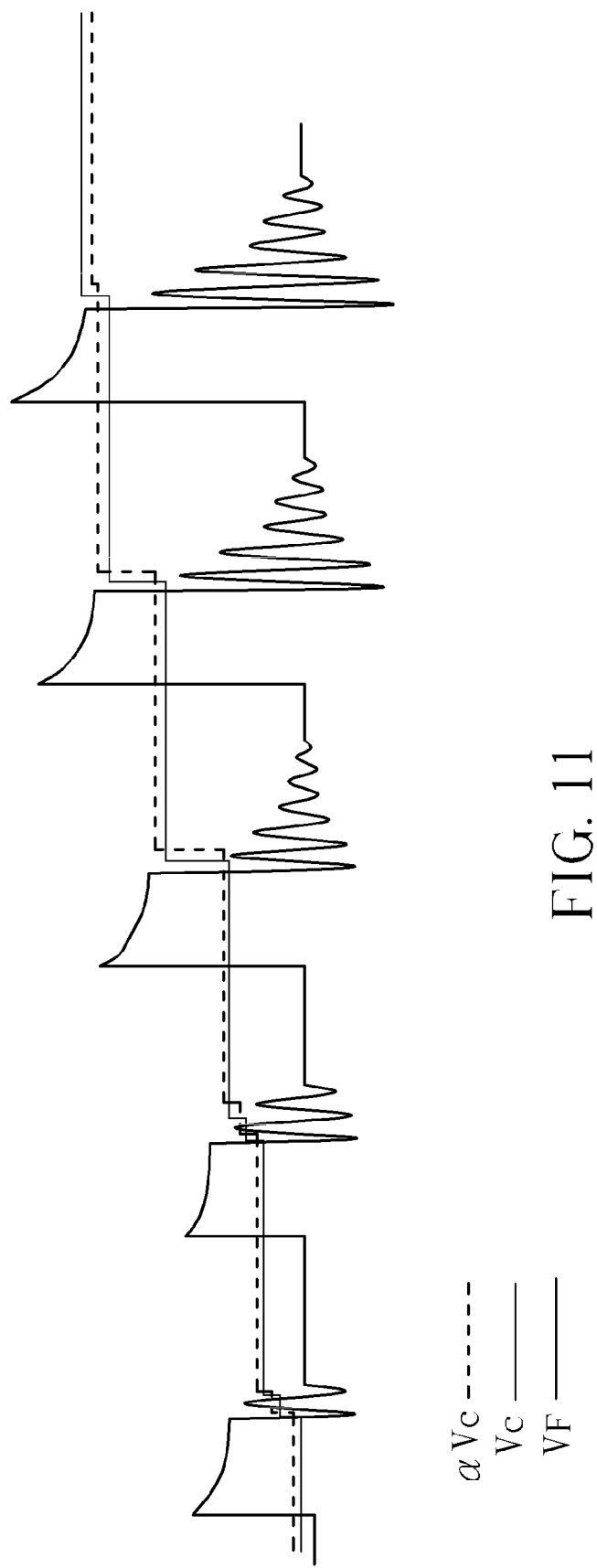

Briefly, when α is a variable and is decided according to the comparison of the voltage $V_c$ and the knee point of the divided voltage $V_F$, the adjustable reference voltage $V_{REF}$ ($\alpha V_c$) can prevent the voltage $V_c$ from being deadlocked resulting from LC ringing occurring on the divided voltage $V_F$, and can help the voltage $V_c$ to approximate to knee point of the divided voltage $V_F$. Besides, please refer to FIG. 11, which is similar to FIG. 10 and illustrates a voltage waveform diagram of the divided voltage $V_F$, the voltage $V_c$ and the reference voltage $V_{REF}$ with the variable α when the power converter 40 is just turned on. Regardless of whether the power converter is in the abnormal operating state or is just turned on, the reference voltage $V_{REF}$ with the variable α prevents the voltage $V_c$ from being deadlocked resulting from LC ringing.

Figure 12:
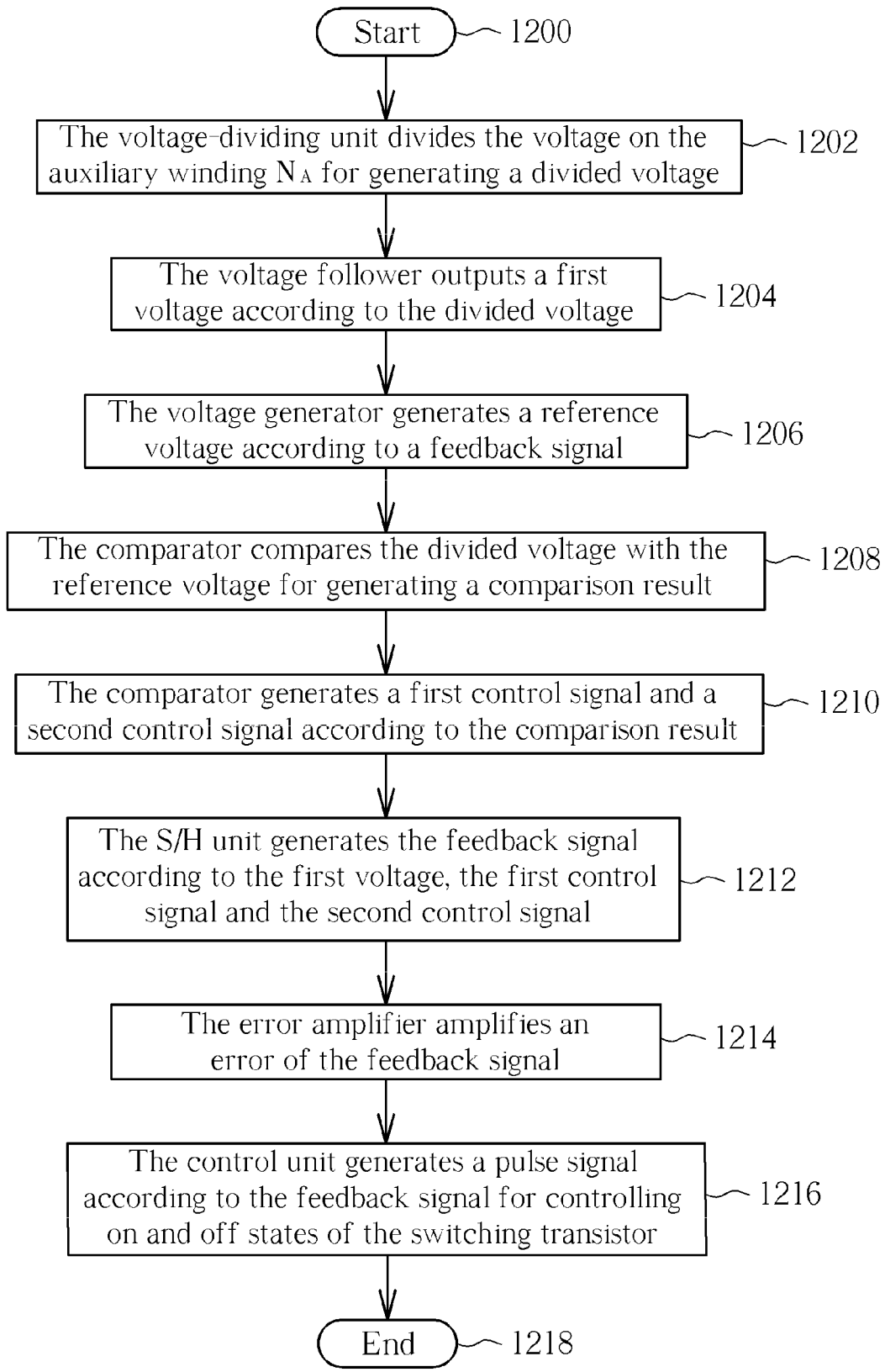
FIG. 12 is a flowchart of a process according to an embodiment of the present invention.

Please refer to FIG. 12, which is a flowchart of a process 120 utilized in the power converter 40 according to an embodiment of the present invention. The process 120 comprises the following steps:

Step 1200: Start.

Step 1202: The voltage dividing unit 410 divides the voltage on the auxiliary winding $N_A$ for generating a divided voltage.

Step 1204: The voltage follower 412 outputs a first voltage according to the divided voltage.

Step 1206: The voltage generator 422 generates a reference voltage according to a feedback signal.

Step 1208: The comparator 414 compares the divided voltage with the reference voltage for generating a comparison result.

Step 1210: The comparator 414 generates a first control signal and a second control signal according to the comparison result.

Step 1212: The S/H unit 416 generates the feedback signal according to the first voltage, the first control signal and the second control signal.

Step 1214: The error amplifier 418 amplifies an error of the feedback signal.

Step 1216: The control unit 420 generates a pulse signal according to the feedback signal for controlling on and off states of the switching transistor 406.

Step 1218: End.

Please also refer to the power converter 40 mentioned previously to understand the process 120. Note that the process 120 is one of embodiments of the present invention, and those skilled in the art can make alterations and modifications accordingly. For example, if the power converter 40 does not comprise the voltage follower 412, Step 1204 can be ignored; and, if the power converter 40 does not comprise the error amplifier 418, Step 1214 can be ignored. Besides, the S/H unit 416 in FIG. 5 is one embodiment, and the use of the process 120 is not limited by components included in the S/H unit 416 in FIG. 5. In Step 1210, the comparator 414 generates the first control signal and the second control signal; in another embodiment, the comparator 414 can generate only one control signal sent to another unit including an inverter to generate one more control signal. In addition, the reference voltage is a variable or a constant times the voltage of the feedback signal. The variable α prevents the voltage of the feedback signal from being deadlocked resulting from LC ringing.

In conclusion, the primary-side feedback control device according to the present invention uses the comparator and the sample-and-hold unit to generate the feedback signal according to the knee point of the voltage on the auxiliary winding. Moreover, the primary-side feedback control device generates an adjustable reference voltage used by the comparator according to the voltage of the feedback signal. Therefore, the primary-side feedback control device according to the present invention does not need the optocoupler and the shunt regulator diode TL431, and prevents the voltage of the feedback signal from being deadlocked resulting from LC ringing when the power converter is in the abnormal operating state or is just turned on.

Those skilled in the art will readily observe that numerous modifications and alterations of the device and method may be made while retaining the teachings of the invention.

What is claimed is:

1. A primary-side feedback control device for a power converter, the primary-side feedback control device comprising:
   a control unit for generating a pulse signal according to a feedback signal for controlling on and off states of a switching transistor of the power converter;
   a comparator coupled to an auxiliary winding of a primary side of the power converter for generating at least one control signal according to a voltage on the auxiliary winding and a reference voltage;
   a sample-and-hold unit coupled to the auxiliary winding, the comparator and the control unit, for generating the feedback signal according to the voltage on the auxiliary winding and the at least one control signal; and
   a voltage generator coupled to the control unit, the comparator, and the sample-and-hold unit for generating the reference voltage outputted to the comparator according to the feedback signal
   wherein the sample-and-hold unit comprises at least one switch and one capacitor.

2. The primary-side feedback control device of claim 1, wherein the reference voltage is a constant times a voltage of the feedback signal.

3. The primary-side feedback control device of claim 1, wherein the reference voltage is a variable times a voltage of the feedback signal.

4. The primary-side feedback control device of claim 3, wherein the variable is adjusted according to a comparison of the voltage of the feedback signal and a knee point of a voltage reflecting variation of the voltage on the auxiliary winding.

5. The primary-side feedback control device of claim 4, wherein when the voltage of the feedback signal is lower than the knee point voltage, the variable is set greater than 1.

6. The primary-side feedback control device of claim 4, wherein when the voltage of the feedback signal is higher than or equal to the knee point voltage, the variable is set less than or equal to 1.

7. The primary-side feedback control device of claim 1 further comprising a voltage follower coupled between the auxiliary winding and the sample-and-hold unit for outputting a voltage to the sample-and-hold unit according to the voltage on the auxiliary winding.

8. The primary-side feedback control device of claim 1 further comprising an error amplifier coupled between the sample-and-hold unit and the control unit for amplifying an error of the feedback signal.

9. The primary-side feedback control device of claim 1, wherein the sample-and-hold unit comprises:
   a first switch coupled to the comparator;
   a second switch coupled to the comparator, the first switch and the control unit;
   a first capacitor comprising one terminal coupled to the first switch and the second switch and another terminal coupled to a ground terminal; and
   a second capacitor comprising one terminal coupled to the second switch and the control unit and another terminal coupled to the ground terminal.

10. The primary-side feedback control device of claim 9, wherein when the voltage on the auxiliary winding is higher than the reference voltage, the comparator outputs a first control signal to turn on the first switch and outputs a second control signal to turn off the second switch, for transferring the voltage on the auxiliary winding to the first capacitor.

11. The primary-side feedback control device of claim 9, wherein when the voltage on the auxiliary winding is lower than or equal to the reference voltage, the comparator outputs a first control signal to turn off the first switch and outputs a second control signal to turn on the second switch, for transferring a voltage on the first capacitor to the second capacitor.

12. A power converter of primary-side feedback control comprising:
   an input terminal for receiving an input voltage;
   an output terminal for outputting an output voltage;
   a transformer comprising a primary winding coupled to the input terminal, an auxiliary winding coupled to the primary winding, and a secondary winding coupled to the output terminal for transferring the input voltage to the output voltage;
   a switching transistor coupled to the primary winding for controlling the transformer to store and transfer energy according to a pulse signal; and
   a feedback control device coupled to the switching transistor comprising:
      a control unit for generating the pulse signal according to a feedback signal for controlling on and off states of the switching transistor;
      a comparator coupled to the auxiliary winding for generating at least one control signal according to a voltage on the auxiliary winding and a reference voltage; and
      a sample-and-hold unit coupled to the auxiliary winding, the comparator and the control unit, for generating the feedback signal according to the voltage on the auxiliary winding and the at least one control signal; and
      a voltage generator coupled to the control unit, the comparator and the sample-and-hold unit for generating the reference voltage outputted to the comparator according to the feedback signal;
   wherein the sample-and-hold unit comprises at least one switch and one capacitor.

13. The power converter of claim 12, wherein the reference voltage is a constant times a voltage of the feedback signal.

14. The power converter of claim 12, wherein the reference voltage is a variable times a voltage of the feedback signal.

15. The power converter of claim 12, wherein the variable is adjusted according to a comparison of a voltage of the feedback signal and a knee point of a voltage reflecting variation of the voltage on the auxiliary winding.

16. The power converter of claim 15, wherein when the voltage of the feedback signal is lower than the knee point voltage, the variable is set greater than 1.

17. The power converter of claim 15, wherein when the voltage of the feedback signal is higher than or equal to the knee point voltage, the variable is set less than or equal to 1.

18. The power converter of claim 12, wherein the feedback control device further comprises a voltage follower coupled between the auxiliary winding and the sample-and-hold unit for outputting a voltage to the sample-and-hold unit according to the voltage on the auxiliary winding.

19. The power converter of claim 12, wherein the feedback control device further comprises an error amplifier coupled between the sample-and-hold unit and the control unit for amplifying an error of the feedback signal.

20. The power converter of claim 12, wherein the sample-and-hold unit comprises:
   a first switch coupled to the comparator;
   a second switch coupled to the comparator, the first switch and the control unit;
   a first capacitor comprising one terminal coupled to the first switch and the second switch and another terminal coupled to a ground terminal; and
   a second capacitor comprising one terminal coupled to the second switch and the control unit and another terminal coupled to the ground terminal.

21. The power converter of claim 20, wherein when the voltage on the auxiliary winding is higher than the reference voltage, the comparator outputs a first control signal to turn on the first switch and outputs a second control signal to turn off the second switch, for transferring the voltage on the auxiliary winding to the first capacitor.

22. The power converter of claim 20, wherein when the voltage on the auxiliary winding is lower than or equal to the reference voltage, the comparator outputs a first control signal to turn off the first switch and outputs a second control signal to turn on the second switch, for transferring a voltage on the first capacitor to the second capacitor.

23. A feedback control method for a power converter, the feedback control method comprising:
   generating a first voltage according to a voltage on a primary-side auxiliary winding of the power converter;
   comparing the voltage on the auxiliary winding with a reference voltage for generating a comparison result;
   generating at least one control signal according to the comparison result;
   generating a feedback signal according to the first voltage and the at least one control signal, for controlling on and off states of a switching transistor of the power converter; and
   generating the reference voltage according to the feedback signal.

24. The feedback control method of claim 23, wherein the reference voltage is a constant times a voltage of the feedback signal.

25. The feedback control method of claim 23, wherein the reference voltage is a variable times a voltage of the feedback signal.

26. The feedback control method of claim 23, wherein the variable is adjusted according to a comparison of a voltage of the feedback signal and a knee point of a voltage reflecting variation of the voltage on the auxiliary winding.

27. The feedback control method of claim 26, wherein when the voltage of the feedback signal is lower than the knee point voltage, the variable is set greater than 1.

28. The feedback control method of claim 26, wherein when the voltage of the feedback signal is higher than or equal to the knee point voltage, the variable is set less than or equal to 1.

29. The feedback control method of claim 23 further comprising:
generating a pulse signal according to the feedback signal for controlling on and off states of the switching transistor.

30. The feedback control method of claim 23 further comprising:
amplifying an error of the feedback signal.

31. The feedback control method of claim 23 further comprising:
dividing the voltage on the auxiliary winding for generating a divided voltage; and
generating the first voltage according to the divided voltage.

32. The feedback control method of claim 23, wherein the step of generating the at least one control signal according to the comparison result comprises generating a first control signal and a second control signal according to the comparison result.

33. The feedback control method of claim 32, wherein when the voltage on the auxiliary winding is higher than the reference voltage, the voltage on the auxiliary winding is transferred to a first capacitor according to the first control signal and the second control signal.

34. The feedback control method of claim 33, wherein when the voltage on the auxiliary winding is lower than or equal to the reference voltage, a voltage on the first capacitor is transferred to a second capacitor according to the first control signal and the second control signal for generating the feedback signal.

* * * * *